US009611046B1

(12) United States Patent
Takeuchi (10) Patent No.: US 9,611,046 B1
(45) Date of Patent: Apr. 4, 2017

(54) LINK MEMBER FOR CONNECTING AIRCRAFT PYLON TO WING OF AIRCRAFT, AIRCRAFT PYLON, AND AIRCRAFT

(71) Applicant: MITSUBISHI AIRCRAFT CORPORATION, Aichi (JP)

(72) Inventor: Akira Takeuchi, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 381 days.

(21) Appl. No.: 14/161,113

(22) Filed: Jan. 22, 2014

(30) Foreign Application Priority Data

Jan. 25, 2013 (JP) ................................. 2013-011747

(51) Int. Cl.
*B64D 29/00* (2006.01)
*B64D 27/26* (2006.01)

(52) U.S. Cl.
CPC .................................... *B64D 27/26* (2013.01)

(58) Field of Classification Search
None
See application file for complete search history.

(56) References Cited

U.S. PATENT DOCUMENTS

| 1,903,064 | A | * | 3/1933 | Onstott | ...................... | F16C 7/04 |
| | | | | | | 74/588 |
| 4,480,498 | A | * | 11/1984 | Konig | ..................... | B60G 7/001 |
| | | | | | | 74/579 R |
| 5,165,306 | A | * | 11/1992 | Hellon | .................... | B60G 7/005 |
| | | | | | | 280/124.107 |
| 5,335,636 | A | * | 8/1994 | Bilei | ........................ | F01L 13/06 |
| | | | | | | 123/321 |
| 7,789,344 | B2 | * | 9/2010 | Cousin | .................... | B64D 27/12 |
| | | | | | | 244/54 |
| 7,926,761 | B2 | * | 4/2011 | Coupe | ..................... | B29C 70/24 |
| | | | | | | 244/102 A |
| 8,757,649 | B2 | * | 6/2014 | Erdogan | ................ | B60G 7/001 |
| | | | | | | 280/124.128 |

(Continued)

FOREIGN PATENT DOCUMENTS

JP H03-114617 U 11/1991
JP 2007-002876 A 1/2007

(Continued)

OTHER PUBLICATIONS

Office Action for Japanese Patent Application No. 2013-011747 of Oct. 18, 2016.

*Primary Examiner* — Medhat Badawi
(74) *Attorney, Agent, or Firm* — Pearne & Gordon LLP (57) ABSTRACT

To provide a link member for connecting a pylon strut and a wing, which link member is easily tightened and removed even when there is a narrow space therearound. A link member 50 includes a link plate 51 functioning as a load transfer element, a coaxial bush 52 provided at one end of the link plate 51, and an eccentric bush 53 provided at the other end of the link plate 51. A set of the link plates consisting of two link plates 51 are arranged opposite to and away from each other with a prescribed distance, and bolts B1 and nuts N1 are used to connect the connecting piece 12 to the wing mount 13. The link member 50 further includes nut retainers 60 provided on the inner side of the link member 50 to restrict rotation of the respective nuts N1.

7 Claims, 7 Drawing Sheets

(56) References Cited

U.S. PATENT DOCUMENTS

| | | | |
|---|---|---|---|
| 9,211,955 B1* | 12/2015 | Mauldin | B64D 27/26 |
| 2003/0025033 A1* | 2/2003 | Levert | B64D 27/26 244/54 |
| 2004/0075234 A1* | 4/2004 | Seksaria | B60G 7/001 280/124.134 |
| 2005/0109113 A1* | 5/2005 | Baba | G01L 19/0645 73/700 |
| 2005/0199199 A1* | 9/2005 | Eguchi | F01L 13/0021 123/90.16 |
| 2006/0038065 A1* | 2/2006 | Howe | B64D 29/00 244/54 |
| 2006/0232038 A1* | 10/2006 | Weise | B60G 7/001 280/124.134 |
| 2007/0180698 A1* | 8/2007 | Ide | B23K 20/122 29/897.2 |
| 2008/0067286 A1* | 3/2008 | Cousin | B64D 27/12 244/54 |
| 2008/0169378 A1* | 7/2008 | Beaufort | B64D 27/26 244/54 |
| 2008/0217502 A1* | 9/2008 | Lafont | B64D 27/26 248/554 |
| 2008/0230675 A1* | 9/2008 | Audart-Noel | B64D 27/26 248/554 |
| 2009/0200418 A1* | 8/2009 | Beaufort | B64D 27/26 244/54 |
| 2011/0133425 A1* | 6/2011 | Jeong | B60G 7/001 280/124.134 |
| 2012/0085859 A1* | 4/2012 | Barnes | B64D 27/26 244/54 |
| 2012/0234280 A1* | 9/2012 | Kimura | F02N 11/00 123/179.25 |

FOREIGN PATENT DOCUMENTS

| | | |
|---|---|---|
| JP | 2009-530562 A | 8/2009 |
| JP | 2011-116186 A | 6/2011 |

* cited by examiner

LINK MEMBER FOR CONNECTING AIRCRAFT PYLON TO WING OF AIRCRAFT, AIRCRAFT PYLON, AND AIRCRAFT

BACKGROUND OF THE INVENTION

Field of the Invention

The present invention relates to a link member for connecting an aircraft pylon to a wing of an aircraft, an aircraft pylon, and an aircraft.

Description of the Related Art

An engine of an aircraft is mounted to a wing via a structural member called a pylon strut (see, for example, Japanese Patent Laid-Open No. 2011-116186).

Figure 7:
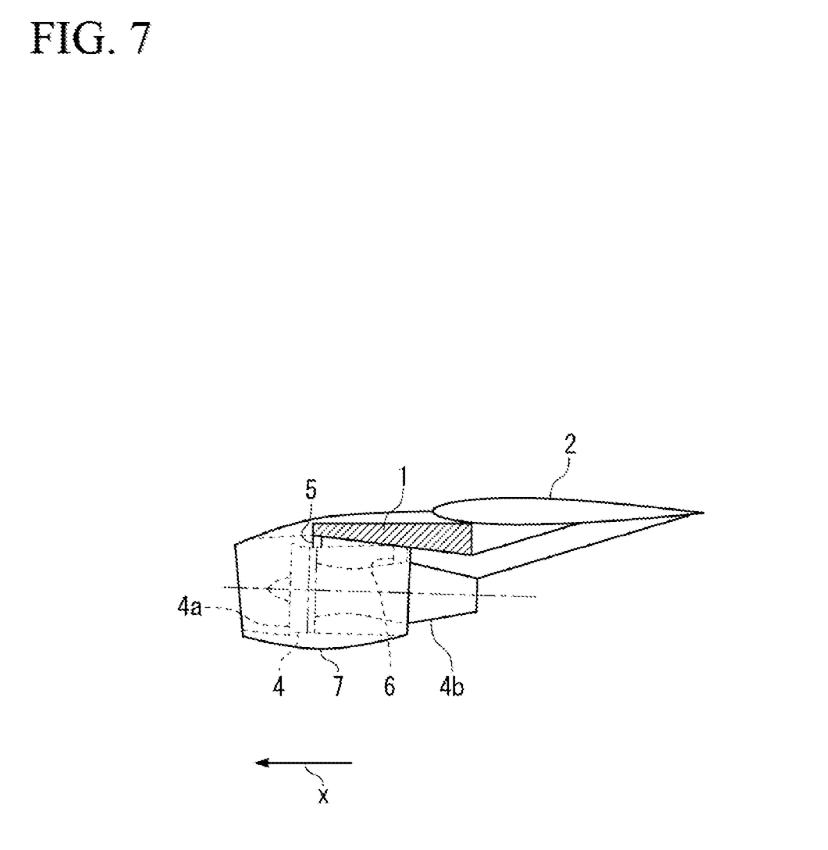
FIG. 7 is a diagram showing a pylon strut to which a link member of the present embodiment is applied, and its surrounding structure.

As shown in FIG. 7, a pylon strut 1 is provided at an undersurface of a wing 2 to extend toward a front (x) in a flying direction. In an engine 4, a fan section 4a at the front is mounted to an undersurface of the pylon strut 1 by a front engine mount 5, and a core section 4b at the rear is mounted to the undersurface of the pylon strut 1 by a rear engine mount 6.

Forces in various directions work between the engine 4 side and the pylon strut 1 side. For example, forces, which are caused by the thrust force of the engine 4 and the force at the time of reverse thrust, work in a longitudinal direction. Moreover, at the time of landing, forces in a vertical direction work. The force in the vertical direction may include impacts and the like which occur, for example, at the time of hard landing (landing accompanied by the impact in the vertical direction) and at the time of belly landing. Furthermore, at the time of operation of the engine 4, torque caused by rotation of the fan also works in the rotation direction. Therefore, the front engine mount 5 and the rear engine mount 6 have sufficient strength against these forces.

Meanwhile, the pylon strut 1, which connects the engine 4 to the wing 2, is connected to the wing 2 with a link member for transferring and relieving the above-described forces that occur in the pylon strut 1, to the wing 2.

SUMMARY OF THE INVENTION

The link member has both ends respectively fixed to the pylon strut side and the wing side with bolts and nuts. However, there are cases where a space around the link member is not sufficient for fixing operation.

The present invention was made in view of such a problem, and an object of the present invention is to provide a link member for connecting a pylon strut and a wing, which link member is easily tightened and removed even when there is a narrow space therearound.

The present invention, which is made to achieve the object, relates to a link member for connecting an aircraft pylon to a wing of an aircraft.

The link member of the present invention includes a first load transfer member and a second load transfer member. The first and second load transfer members are arranged opposite to and away from each other with a prescribed distance.

The first load transfer member includes a first load transfer section, and further includes a 1A connecting section and a 1B connecting section respectively provided at both ends of the first load transfer section.

The second load transfer member includes a second load transfer section, and further includes a 2A connecting section and a 2B connecting section respectively provided at both ends of the second load transfer section.

The link member of the present invention includes a first fastener and a second fastener.

The first fastener includes a bolt and a nut for fastening the pylon to the 1A and 2A connecting sections, the bolt extending through the 1A and 2A connecting sections.

The second fastener includes a bolt and a nut for fastening the wing to the 1B and 2B connecting sections, the bolt extending through the 1B and 2B connecting sections.

As used herein, the expression "fastening" encompasses indirect fastening as well as direct fastening. The direct fastening refers to a fastening relationship between a link plate 51 and a pylon strut 11 (connecting piece 12) as described later, and the indirect fastening refers to a fastening relationship between the link plate 51 and a wing mount 13 as described later.

The link member of the present invention includes a rotation restricting member for restricting rotation of the respective nuts of the first and second fasteners. The rotation restricting member is fixed to either one of the first and second load transfer sections where the nut is located.

The link member of the present invention includes the rotation restricting member, which eliminates the need of fixing the nuts by hand at the time of both tightening and removing the first and second fasteners.

In the link member of the present invention, an eccentric bush is provided at the 1A and 1B connecting sections. The bolt of the first fastener may be supported by the 1A and 1B connecting sections with the eccentric bush provided therebetween.

In this case, the rotation restricting member is preferably provided as divided pieces consisting of a first member and a second member which correspond to the first fastener and the second fastener, respectively.

When the eccentric bush is adjusted, the distance between the bolts of the first and second fasteners varies. However, the divided first and second members can be easily adapted to this variation.

The link member of the present invention includes a fall-off preventing member for preventing the respective bolts of the first and second fasteners from falling off. The fall-off preventing member is preferably fixed to either one of the first and second load transfer sections where the head of the bolt is located because this further improves the safety of the link member.

Unlike the rotation restricting member, the fall-off preventing member does not cause any inconveniences even when it is formed as a single piece. Thus, the fall-off preventing member preferably comprises a single piece for preventing the fall-off of the respective bolts of the first and second fasteners.

The fall-off preventing member preferably includes a locking piece, which is locked by the bolt of either one of the first and second fasteners, to prevent displacement of the fall-off preventing member. This effectively maintains the state in which the fall-off preventing member prevents the fall-off of the bolts.

The link member of the present invention is particularly advantageous in the following cases. That is, when the link member is mounted to the pylon and the wing thereby defining a front side and an inner side where a mounting operation is conducted on the front side and the inner side is opposite to the front side across the link member, it is preferable that the respective bolts of the first and second fasteners are located on the front side, and that the respective nuts of the first and second fasteners are located on the inner side. This eliminates the need of access to the inner side where it is difficult to conduct the mounting operation.

According to the present invention, the link member includes a rotation restricting member for restricting rotation of the respective nuts of the first and second fasteners, which can eliminate the need of fixing the nuts by hand at the time of both tightening and removing the first and second fasteners. In other words, the present invention can provide a link member for connecting a pylon strut and a wing, which link member is easily tightened and removed even when there is a narrow space therearound.

DETAILED DESCRIPTION OF THE PREFERRED EMBODIMENTS

Hereinafter, a link member in accordance with an embodiment of the present invention will be described in detail with reference to the accompanying drawings. In the following description, "front" and "rear" are determined based on a flying direction of an aircraft.

A link member 50 of the present embodiment is used to connect a wing of an aircraft to a pylon strut that constitutes a pylon. First, referring to FIG. 6, a pylon strut and its surrounding general structure are described.

Figure 6:
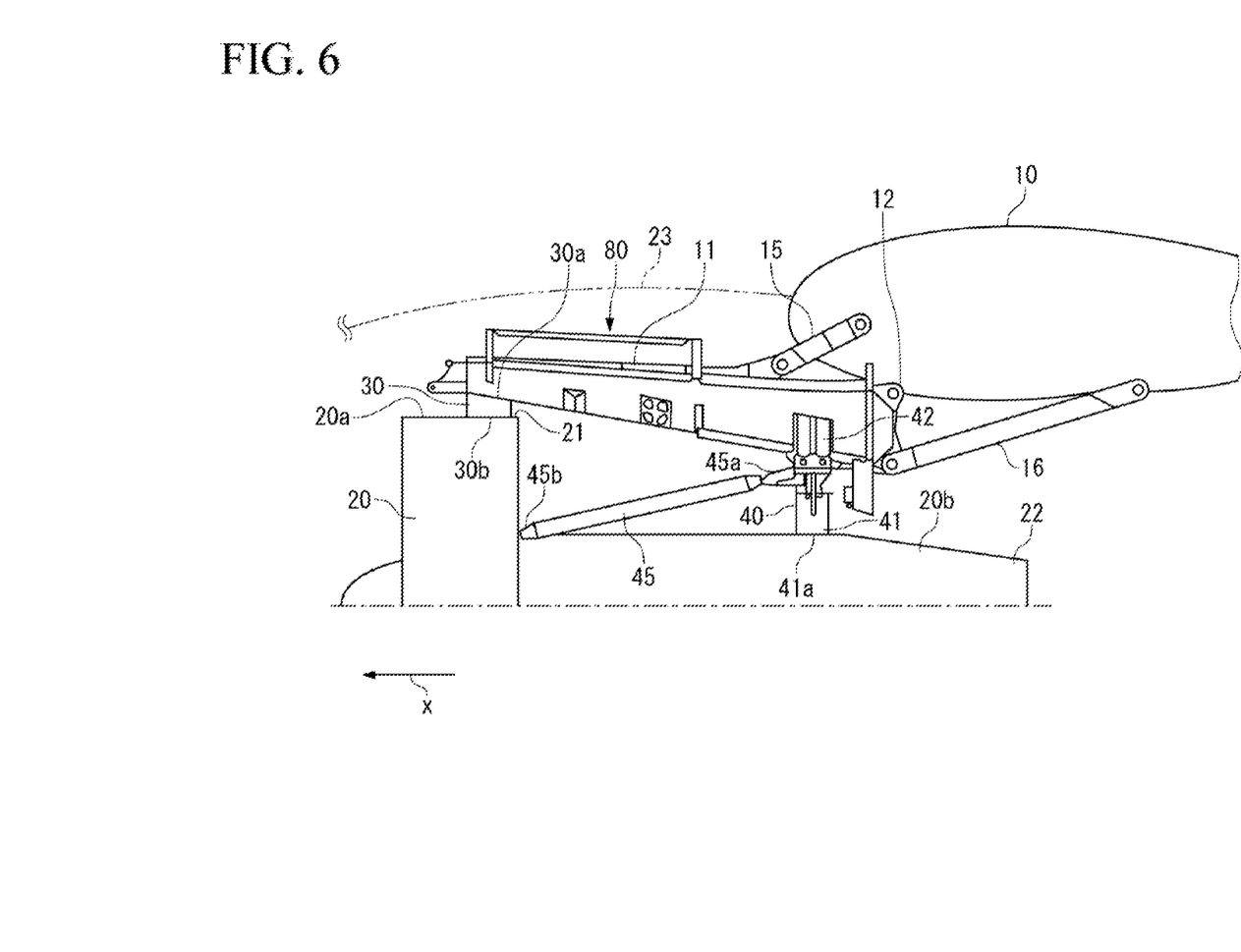
FIG. 6 is a diagram showing a conventional structure for mounting an engine to a wing of an aircraft.

As shown in FIG. 6, a turbofan type engine 20 is supported by a pylon 80 on a wing 10 of an aircraft. The pylon 80 is configured to include a pylon strut 11, and link members 15, 16 connecting the pylon strut 11 to the wing 10. Note that the link members 15, 16 are located at different sites from the link member 50 of the present embodiment.

The pylon strut 11 is provided at an undersurface of the wing 10 to extend toward a front (x) in a flying direction. The shape of the pylon strut 11 in a section orthogonal to a longitudinal direction is trapezoidal and its sectional area gradually reduces toward the front side from the rear side.

The engine 20 includes a fan section 20a provided at the front (x) in the flying direction, and an engine core section 20b provided at the rear of the fan section 20a. The fan section 20a is provided with a fan incorporated inside a shroud 21 circular in section. The engine core section 20b is accommodated in a housing 22 in a cylindrical shape with a diameter smaller than that of the fan section 20a, and includes a mechanism for driving the fan.

In the engine 20, the fan section 20a is mounted to the undersurface of the pylon strut 11 by a front engine mount 30, and the engine core section 20b is mounted to the undersurface of the pylon strut 11 by a rear engine mount 40.

The engine 20 and the pylon strut 11 are accommodated in a cylindrical engine nacelle 23.

The front engine mount 30 includes a top surface 30a that is fixed to the undersurface of the pylon strut 11, and an undersurface 30b that is fixed to the shroud 21 of the fan section 20a of the engine 20, by connecting means such as bolts.

The rear engine mount 40 is formed to include an engine side mount member 41 fixed to the engine 20 side, and a strut side mount member 42 fixed to the pylon strut 11 side.

Here, the engine side mount member 41 has an undersurface 41a fixed to the top surface of the housing 22 of the engine core section 20b of the engine 20 by connecting means such as bolts.

Furthermore, one end 45a of a reinforcing rod 45 is connected to an upper portion of the engine side mount member 41. The reinforcing rod 45 has the other end 45b connected to the vicinity of a connecting section of the engine core section 20b and the fan section 20a of the engine 20. This allows the reinforcing rod 45 to reinforce support for the front side of the engine 20.

Figure 1:
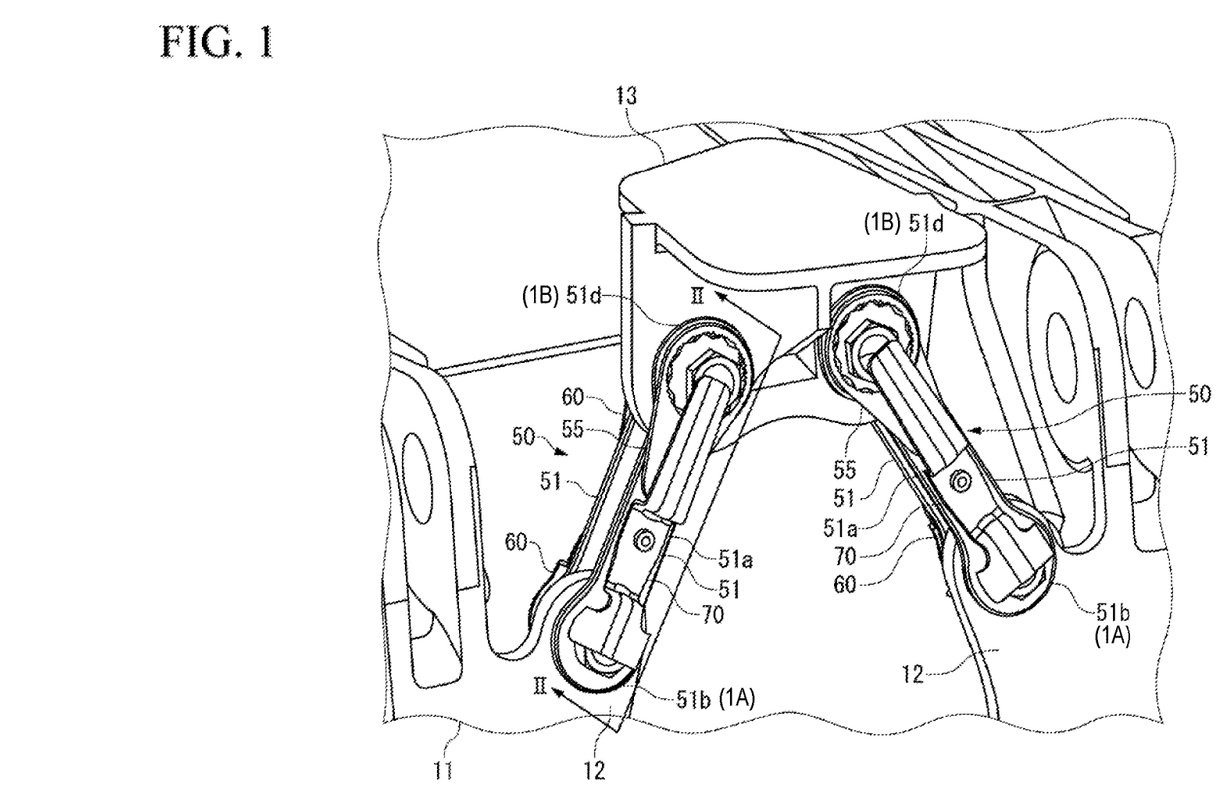
FIG. 1 is a perspective view illustrating a situation in which a link member of the present embodiment connects a pylon strut and a wing fixing mount.

The link member 50 is a member for connecting the pylon strut 11 to the wing 10. The pylon strut 11 is provided at its rear end with a connecting piece 12 which projects towards the wing 10 for the connection. On the other hand, the wing 10 is provided with a wing mount 13 (see FIG. 1) that is directly connected to the link member 50, and the link member 50 is supported on and fixed to the wing mount 13.

The particular configuration of the link member 50 is described below with reference to FIGS. 1 to 5.

The link member 50 has one end (lower end) to be connected to the connecting piece 12 of the pylon strut 11, and the other end (upper end) to be connected to the wing mount 13. In the present embodiment, two sets of the link members 50 are arranged in a splayed manner, to support the wing mount 13 (and the wing 10), and simultaneously to transfer and relieve lateral loads and other forces that occur in the pylon strut 11 to the wing 10. Thus, the link member 50 functions as a load transfer member between the pylon strut 11 and the wing 10, in addition to providing the mechanical support.

Please note that, although the terms "front" and "rear" are defined as described above, in regard to FIG. 2, the right side of the link member 50 may be called a front side, and the left side of the link member may be called an inner side.

Figure 2:
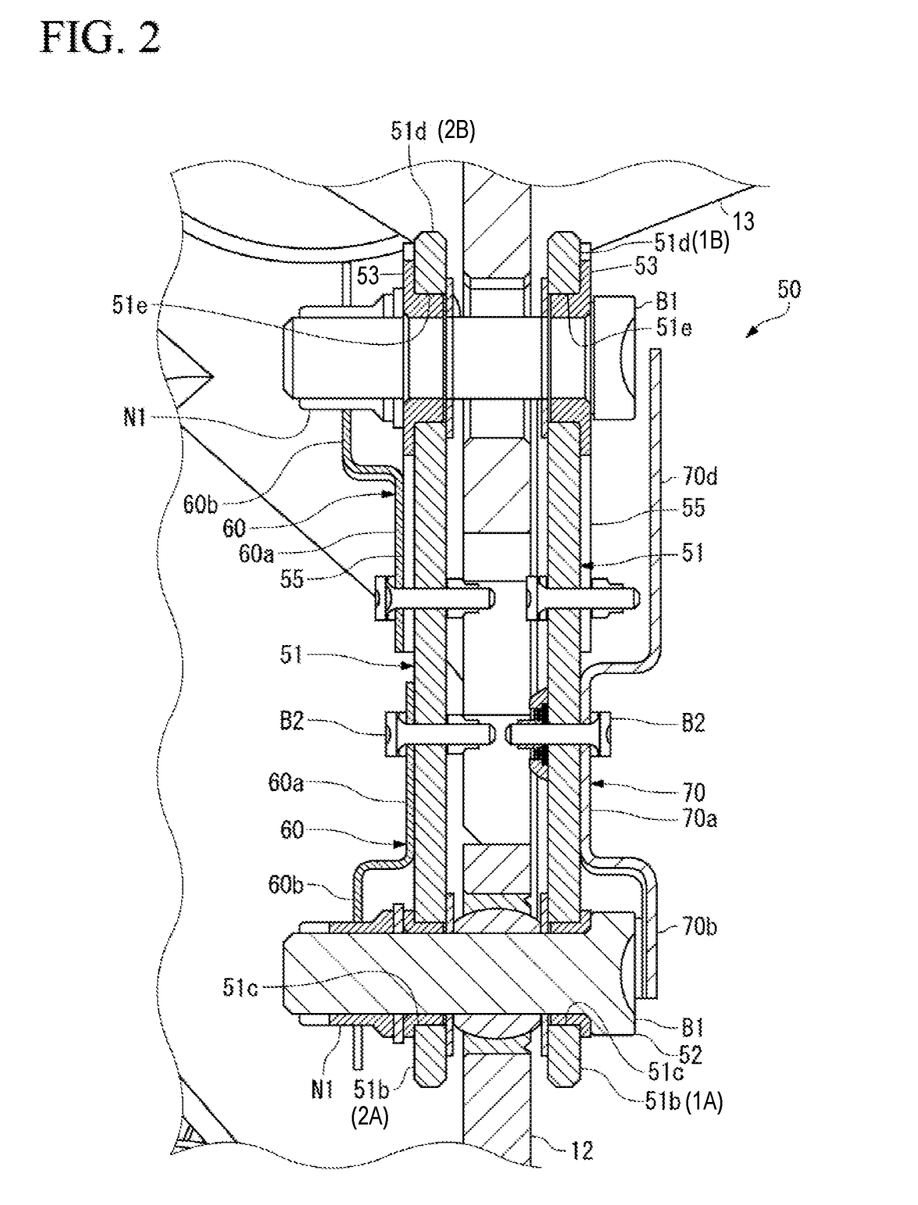
FIG. 2 is a cross-sectional view taken along line II-II and seen in the direction of arrow in FIG. 1.
Figure 3:
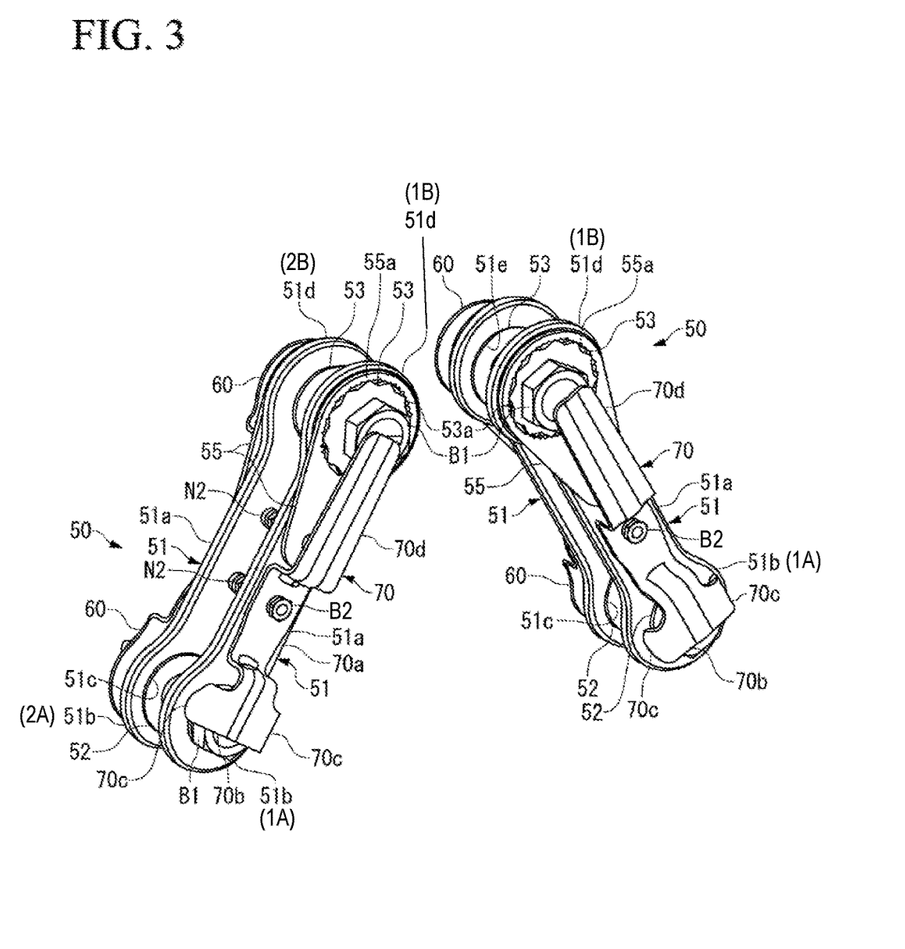
FIG. 3 is a perspective view illustrating only the link member of FIG. 1 seen from the front side.
Figure 4:
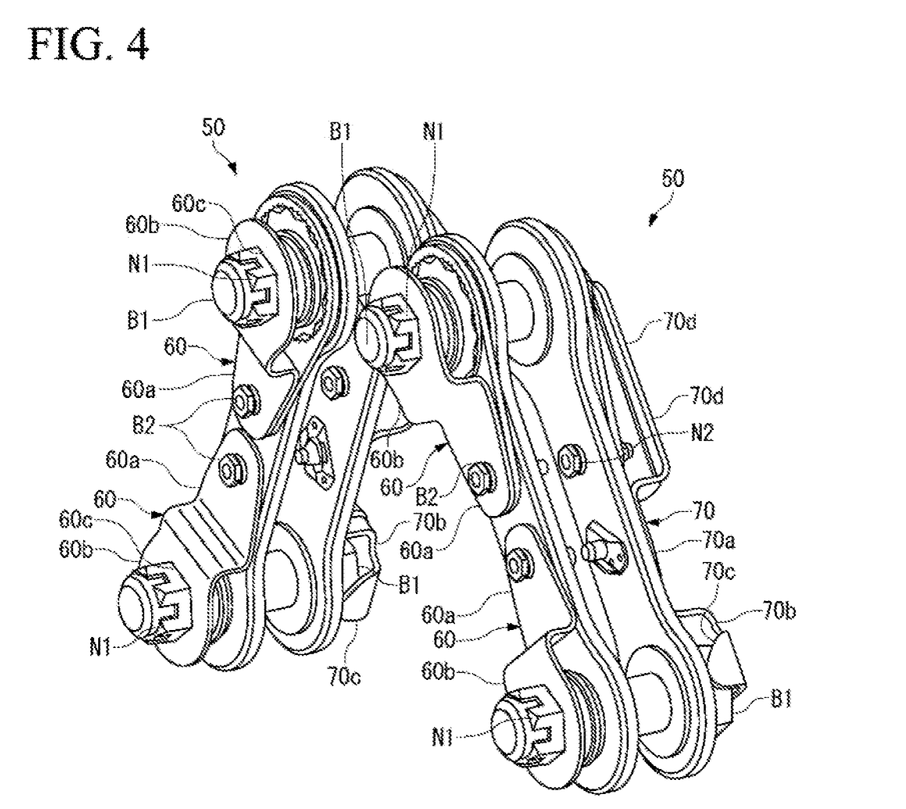
FIG. 4 is a perspective view illustrating only the link member of FIG. 1 seen from the inner side.

As shown in FIGS. 2 to 4, the link member 50 includes a link plate 51 functioning as a load transfer element, a coaxial bush 52 provided at one end of the link plate 51, an eccentric bush 53 provided at the other end of the link plate 51, and a handle 55 for operating the eccentric bush 53. A set of the link plates consisting of two link plates 51 are arranged opposite to and separated from each other with a prescribed distance, and bolts B1 are passed through the coaxial bush 52 and eccentric bush 53, respectively, and nuts N1 are coupled to the exposed screw portions and tightened to connect the connecting piece 12 to the wing mount 13.

The link member 50 further includes nut retainers 60 and bolt retainers 70.

The nut retainers 60 are provided on the inner side of the link member 50 to restrict rotation of the respective nuts N1. The bolt retainers 70 are provided on the front side of the link member 50 to prevent the respective bolts B1 from falling off.

Hereinafter, in a set of the two link plates 51, one side of a plate facing to the other plate is defined as an inward side, and the other side or side opposite to the inward side of the plate is defined as an outward side.

Figure 5:
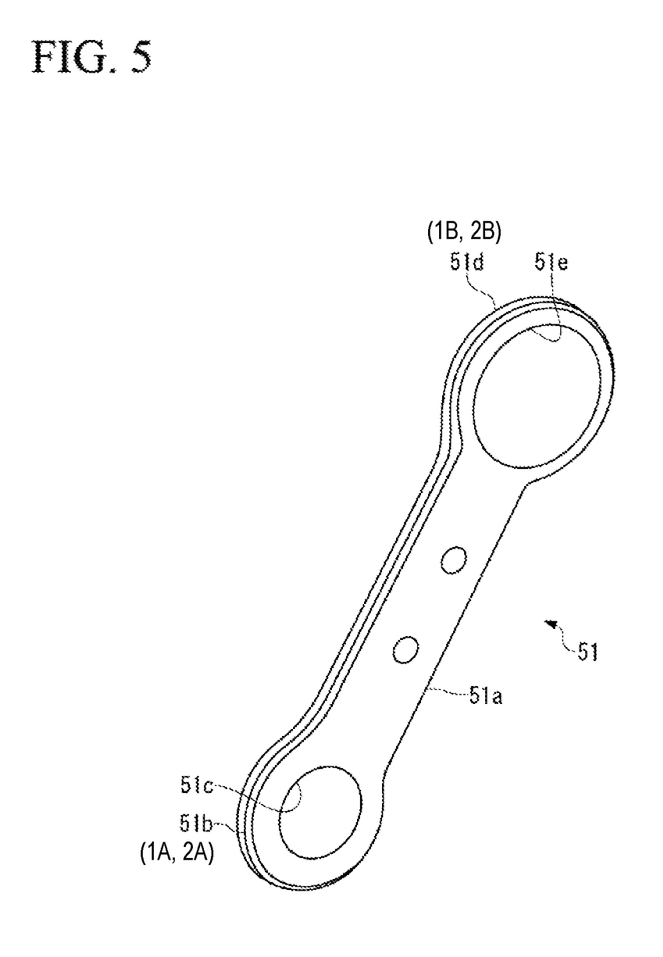
FIG. 5 is a diagram illustrating a link plate.

As shown in FIGS. 3 and 5, the link plate 51 includes a rectangular load transfer section 51a, and circular connecting sections 51b, 51d respectively provided at both ends of the load transfer section 51a. The link plate 51 is made of stainless steel or other metal materials, and formed integrally with the load transfer section 51a and the connecting sections 51b, 51d by using processing methods such as pressing, casting, and machining. The link plate may be made of any material other than metal having necessary load resistant capacity, such as carbon fiber composite material.

The load transfer section 51a constitutes a main part for transferring load from the pylon strut 11 to the wing 10. The amount of load to be transferred can be adjusted by setting the thickness of the load transfer section 51a as appropriate.

The connecting section 51b is located at one end in the longitudinal direction of the load transfer section 51a, and provided with a through-hole 51c in which the coaxial bush 52 is press-fitted and held. On the other hand, the connecting section 51d is located at the other end in the longitudinal direction of the load transfer section 51a, and provided with a through-hole 51e in which the eccentric bush 53 is press-fitted and held.

The coaxial bush 52 is a hollow cylindrical member having coaxial outer and inner peripheries, through which the bolt B1 is passed.

The eccentric bush 53 is a hollow cylindrical member having eccentric outer and inner peripheries. The eccentric bush 53 is provided axially at its one end with a flange 53a to be exposed outside the link plate 51. The flange 53a is provided with notches continuously formed around its periphery. A handle 55 has an acting edge 55a that is provided with notches adapted to those of the flange, and is fitted around the flange 53a. When needed, the handle 55 can be operated to cause the eccentric bush 53 to rotate, allowing the inner periphery of the bush to eccentrically rotate, which causes the bolt B1 to eccentrically rotate around the shaft center so as to adjust the position of the shaft center.

By providing the eccentric bush at one end, the distance between the shaft centers of the bolts B1 passing through the coaxial bush 52 and eccentric bush 53 can be adjusted so as to be adapted to the variation of the distance between the pylon strut 11 and the wing mount 13 among individuals, where the variation is caused due to manufacturing tolerances.

The nut retainer 60 is fixed on the surface of the link plate 51 disposed on the inner side to restrict rotation of the nut N1 tightened to the bolt B1.

The nut retainer 60 includes a mounting section 60a to be fixed to the load transfer section 51a of the link plate 51 with a bolt B2 and a nut N2 tightened together, and a locking section 60b defining a locking hole 60c to be fitted around the nut N1. The locking hole 60c is formed in a hexagonal shape with the size to closely fit with the outer periphery of the nut N1.

The nut retainer 60 has a step between the mounting section 60a and the locking section 60b, which step is formed by bending a flat metal plate. When the nut retainer 60 is mounted to the link plate 51, the mounting section 60a is in intimate contact with the link plate 51 while the locking section 60b is placed away from the link plate 51. As the nut retainer 60 is formed to have a planar shape which, when mounted, falls within the region of the planar projection of the link plate 51, the nut retainer 60 does not require any special space therefor.

The separate nut retainers 60 are respectively provided as divided pieces for the connecting sections 51b and 51d. The nut retainer is configured as such because the connecting section 51d is provided with the eccentric bush 53. Specifically, it is possible to form the nut retainer 60 as a single piece for the connecting sections 51b and 51d. However, while the adjustment of the eccentric bush 53 causes a change in the distance between the shaft centers of the bolts B1, B1, the nut retainer formed as a single piece would not allow for the adjustment of the distance between the locking holes (60c, 60c). The locking hole which is formed to have a long hole shape, can be adapted to the change in the distance between the shaft centers, it, however, undesirably allows for the rotation of the nut N1. In contrast, in the present embodiment, the link plate 51 has a bolt hole for mounting the nut retainer 60 which corresponds to the connecting section 51d, and is formed to have a long hole shape so as to allow for the adjustment of the eccentric bush 53.

The bolt retainer 70 is fixed on the surface of the link plate 51 disposed on the front side to prevent the fall-off of the bolt B1.

The bolt retainer 70 includes a mounting section 70a to be fixed to the load transfer section 51a of the link plate 51 with a bolt B2 and a nut N2 tightened together, and stopper sections 70b, 70d provided at both ends of the mounting section 70a.

The bolt retainer 70 has steps between the mounting section 70a and the respective stopper sections 70b, 70d, which steps are formed by bending a flat metal plate or molding a composite material into that shape. When the bolt retainer 70 is mounted to the link plate 51, the mounting section 70a is in intimate contact with the link plate 51 while the stopper sections 70b, 70d are placed away from the link plate 51 so that they are spaced apart from the heads of the bolts B1. The stopper section 70b is provided with a pair of flanges 70c extending from both ends of the stopper section 70b in the width direction toward the link plate 51. As the pair of flanges 70c extends to the vicinity of the head of the bolt B1, the bolt B1 is, even when the bolt B2 is loosened to allow the bolt retainer 70 to rotate, locked by the flanges 70c to restrict rotation of the bolt retainer 70. As the bolt retainer 70 is also formed to have a planar shape which falls within the region of the planar projection of the link plate 51, the bolt retainer 70 does not require any special space therefor.

For reference, correspondences between several constitutional elements of the present embodiment and those of the claimed inventions are described below.

The link plates 51 of the present embodiment constitute a load transfer member of the present invention.

One of the set of the link plates 51 constitutes a first load transfer member, and the other constitutes a second load transfer member.

The connecting section 51b of the link plate 51 constitutes a 1A connecting section or a 2A connecting section, and the connecting section 51d constitutes a 1B connecting section or a 2B connecting section.

The bolt B1 and the nut N1 provided at the connecting section 51b constitute a first fastener, and the bolt B1 and the nut N1 provided at the connecting section 51d constitute a second fastener.

Next, the effects achieved by the above-described link member 50 are described below.

In the link member 50, the nut retainer 60 restricts the rotation of the nut N1. Accordingly, in the link member 50, even in cases where a space on the inner side is not sufficient for the nut N1 to be fixed by hand, the bolt B1 can be tightened and removed only by rotating the bolt B1. Thus, according to the present invention, the pylon strut 11 is easily connected to the wing mount 13 (wing 10) even in cases where there is only a narrow space therearound.

Note that, in the link member 50 according to the present invention, the nut N1 is not necessarily placed on the inner side with a narrow space, and the bolt B1 may be placed on the inner side with a narrow space. Again, in this case, the bolt B1 can be tightened and removed only by rotating the bolt B1. However, a space needed for insertion of the bolt B1 is a minimum required space.

Also, the separate nut retainers 60 of the present embodiment are respectively provided for the connecting sections 51b and 51d. Thus, even when the distance between the bolts B1, B1 is changed with the eccentric bush 53 provided in one of the connecting sections 51d, the nut retainers 60 is capable of restricting the rotation of the nuts N1 without any problem.

As the link member 50 of the present embodiment includes the bolt retainer 70, the bolts B1 are prevented from accidentally falling off from the link plate 51.

As the bolt retainer 70 includes flanges 70c which extend to the vicinity of the head of the bolt B1, the rotation of the bolt retainer 70 is restricted. Thus, the link member 50 of the prevent embodiment further ensures that the bolts B1 are prevented from falling off from the link plate 51.

Moreover, in the present embodiment, as a single piece of the bolt retainer 70 is used to prevent the fall-off of the two bolts B1, the workload for fixing the bolt retainer 70 is reduced.

Although, in the above-described embodiments, an example is shown in which two sets of the link members 50 are used, the present invention allows for the use of a mere single set of the link members 50, which, of course, also can achieve the above-described effects.

Furthermore, though, in the above embodiments, the plate-shaped member (link plate 51) is used as a load transfer member, the present invention encompasses the use of load transfer members with other shapes. For example, a member with a rectangular cross section thicker than the link plate 51, or a member with an oval shaped cross section may be used as the load transfer member.

Other than this, the configurations cited in the above described embodiments can be selected or omitted, or can be arbitrarily changed to the other configurations, without departing from the spirit of the present invention.

What is claimed is:

1. A link member for connecting an aircraft pylon to a wing of an aircraft, the link member comprising:
    a first load transfer member including a first load transfer section, and further including a 1A connecting section and a 1B connecting section respectively provided at both ends of the first load transfer section;
    a second load transfer member including a second load transfer section, and further including a 2A connecting section and a 2B connecting section respectively provided at both ends of the second load transfer section, the second load transfer member being arranged opposite to and spaced a distance apart from the first load transfer member;
    a first fastener including a bolt and a nut for fastening the pylon to the 1A and 2A connecting sections, the bolt extending through the 1A and 2A connecting sections;
    a second fastener including a bolt and a nut for fastening the wing to the 1B and 2B connecting sections, the bolt extending through the 1B and 2B connecting sections; and
    a rotation restricting member comprising a first portion that extends at least partially around the nut of at least one of the first and second fasteners for restricting rotation of the respective nut relative to the bolts of the first and second fasteners extending through the connecting sections,
    wherein the rotation restricting member is fixed by a third fastener to one of the first and second load transfer sections where the respective nut is located.

2. The link member according to claim 1,
    wherein an eccentric bush is provided at the 1B and 2B connecting sections,
    wherein the bolt of the second fastener is supported by the 1B and 2B connecting sections with the eccentric bush provided between the bolt of the second fastener and the 1B and 2B connecting sections, and
    wherein the rotation restricting member is provided as divided pieces comprising a first member and a second member which correspond to the first fastener and the second fastener, respectively.

3. The link member according to claim 1, comprising a fall-off preventing member for preventing the respective bolts of the first and second fasteners from falling off,
    wherein the fall-off preventing member is fixed to either one of the first and second load transfer sections where the head of the bolt is located.

4. The link member according to claim 3,
    wherein the fall-off preventing member comprises a single piece, and
    wherein the fall-off preventing member comprises a flange that contacts a portion of at least one of the first fastener and the second fastener to interfere with displacement of the fall-off preventing member relative to the respective bolts of the first and second fasteners.

5. The link member according to claim 1,
    wherein a front side when the link member is mounted to the pylon and the wing, and an inner side on the other side opposite to the front side across the link member exist, and
    wherein the respective bolts of the first and second fasteners are located on the front side, and
    wherein the respective nuts of the first and second fasteners are located on the inner side.

6. An aircraft pylon connected to a wing of an aircraft with a link member,
    wherein the link member is the link member according to claim 1.

7. The link member according to claim 1,
    wherein the rotation restricting member is fixed to an outside surface of either one of the first and second load transfer sections where the nut is located.

* * * * *